United States Patent
Savaris et al.

(10) Patent No.: US 12,219,423 B1
(45) Date of Patent: Feb. 4, 2025

(54) DETECTION OF ELECTRONIC DEVICE PRESENCE USING EMITTED BLUETOOTH LOW ENERGY SIGNALS

(71) Applicant: Ubiety Technologies, Inc., Chicago, IL (US)

(72) Inventors: Augusto Savaris, Chicago, IL (US); Joseph Loftus, Seattle, WA (US); Michael B. Cox, Chicago, IL (US); Keith Puckett, Chicago, IL (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

(21) Appl. No.: 18/436,820

(22) Filed: Feb. 8, 2024

(51) Int. Cl.
*H04W 4/021* (2018.01)
*H04W 8/00* (2009.01)

(52) U.S. Cl.
CPC ........... *H04W 4/021* (2013.01); *H04W 8/005* (2013.01)

(58) Field of Classification Search
CPC .............................. H04W 4/021; H04W 8/005
USPC ...................................................... 455/456.1
See application file for complete search history.

(56) References Cited

U.S. PATENT DOCUMENTS

| | | |
|---|---|---|
| 10,109,166 B1 | 10/2018 | Selinger et al. |
| 10,304,303 B2 | 5/2019 | Selinger et al. |
| 10,382,282 B1* | 8/2019 | Levy-Yurista .... H04M 1/27475 |
| 11,792,455 B1 | 10/2023 | Fu |
| 2013/0128311 A1* | 5/2013 | Kim ....... H04W 12/50 358/1.15 |
| 2014/0046711 A1 | 2/2014 | Borodow |
| 2017/0223754 A1* | 8/2017 | Li ........... H04W 12/02 |
| 2020/0045647 A1* | 2/2020 | Gupta ................ H04W 52/58 |
| 2020/0238991 A1 | 7/2020 | Aragon |
| 2021/0136178 A1 | 5/2021 | Casey |
| 2022/0051548 A1 | 2/2022 | Pellegrini |
| 2023/0316726 A1 | 10/2023 | Selinger et al. |
| 2023/0351873 A1 | 11/2023 | Vazirani |

OTHER PUBLICATIONS

A Study on Device Identification from BLE Advertising Packets with Randomized MAC Addresses Akiyama et al. (Year: 2021).*

* cited by examiner

*Primary Examiner* — William Nealon
(74) *Attorney, Agent, or Firm* — Perkins Coie LLP

(57) ABSTRACT

Methods are disclosed to identify and/or count a number of electronic devices present in an area using emitted passive Bluetooth Low Energy (BLE) signals. The identification and/or counting of Bluetooth-enabled devices improves private and public security in determining human presence. Bluetooth-enabled devices passively emit BLE signals for inter-device communication in the form of Bluetooth Advertising Packets. The packets are sent by BLE-enabled devices to search for other known or compatible BLE devices, and advertise information such as media access control (MAC) addresses, device manufacturers, connection capabilities, and manufacturer-specific data. By passively listening to and decoding the observed BLE signals, access to the packets and the metadata they contain is gained. The disclosed methods can include use of other wireless data transfer protocols, such as Bluetooth and Cellular.

19 Claims, 7 Drawing Sheets

300

320  2021-09-13  14:20:57.243000    304  79:ec:ca:c3:c0:8a    Apple, Inc.

[{'contents': '0x1a', 'data_type_name': 'Flags', 'data_type_value': '0x01'}, {'contents': '0x06', 'data_type_name': 'Tx Power Level', 'data_type_value': '0x0a'}, {'contents': '0x4c0010063b1d2e210c28', 'data_type_name': 'Manufacturer Specific Data', 'data_type_value': '0xff', 'manufacturer_cic': '0x004c', 'manufacturer-data': '0x10063b1d2e210c28'}]    308

328  2021-09-13  14:21:06.826000    332  12:7e:87:c6:36:2a    -

[{'contents': '0x1a', 'data_type_name': 'Flags', 'data_type_value': '0x01'}, {'contents': '0x6ffd', 'data_type_name': 'Complete List of 16-bit Service Class UUIDs', 'data_type_value': '0x03'}, {'contents': '0x6ffdca65381464e66d3ee a42ff9357df796f3742c12d', 'data_type_name': 'Service Data', 'data_type_value': '0x16'}]

324  2021-09-13  14:21:07.414000    312  78:53:15:e4:bc:8e    Apple, Inc.

[{'contents': '0x1a', 'data_type_name': 'Flags', 'data_type_value': '0x01'}, {'contents': '0x06', 'data_type_name': 'Tx Power Level', 'data_type_value': '0x0a'}, {'contents': '0x4c0010063b1d2e210c28', 'data_type_name': 'Manufacturer Specific Data', 'data_type_value': '0xff', 'manufacturer_cic': '0x004c', 'manufacturer-data': '0x10063b1d2e210c28'}]    316

336  2021-09-13  14:21:07.424000    340  18:f0:fc:8e:38:41    -

[{'contents': '0x1a', 'data_type_name': 'Flags', 'data_type_value': '0x01'}, {'contents': '0x6ffd', 'data_type_name': 'Complete List of 16-bit Service Class UUIDs', 'data_type_value': '0x03'}, {'contents': '0x6ffd2a1c3c3f7853aa569 029c00aed8f79e2489c7a42', 'data_type_name': 'Service Data', 'data_type_value': '0x16'}]

*FIG. 3*

DETECTION OF ELECTRONIC DEVICE PRESENCE USING EMITTED BLUETOOTH LOW ENERGY SIGNALS

BACKGROUND

Traditional home and business security systems often lack a reliable way to assess the presence of people quickly and easily in a house or business, leading to high false-alarm rates, account churn, and low customer satisfaction. Motion and magnetic sensors can sometimes be inadequate to identify details of intruders. Traditional surveillance systems can be invasive, expensive, as well as misidentify intruders. As a result, homeowners and business owners using conventional security systems can sometimes attempt to resolve high-risk intruder situations using inconclusive information, resulting in added stress and fear.

BRIEF DESCRIPTION OF THE DRAWINGS

Detailed descriptions of implementations of the present technology will be described and explained through the use of the accompanying drawings.

FIG. 3 is a drawing that illustrates example MAC address rotation.

Figure 1:
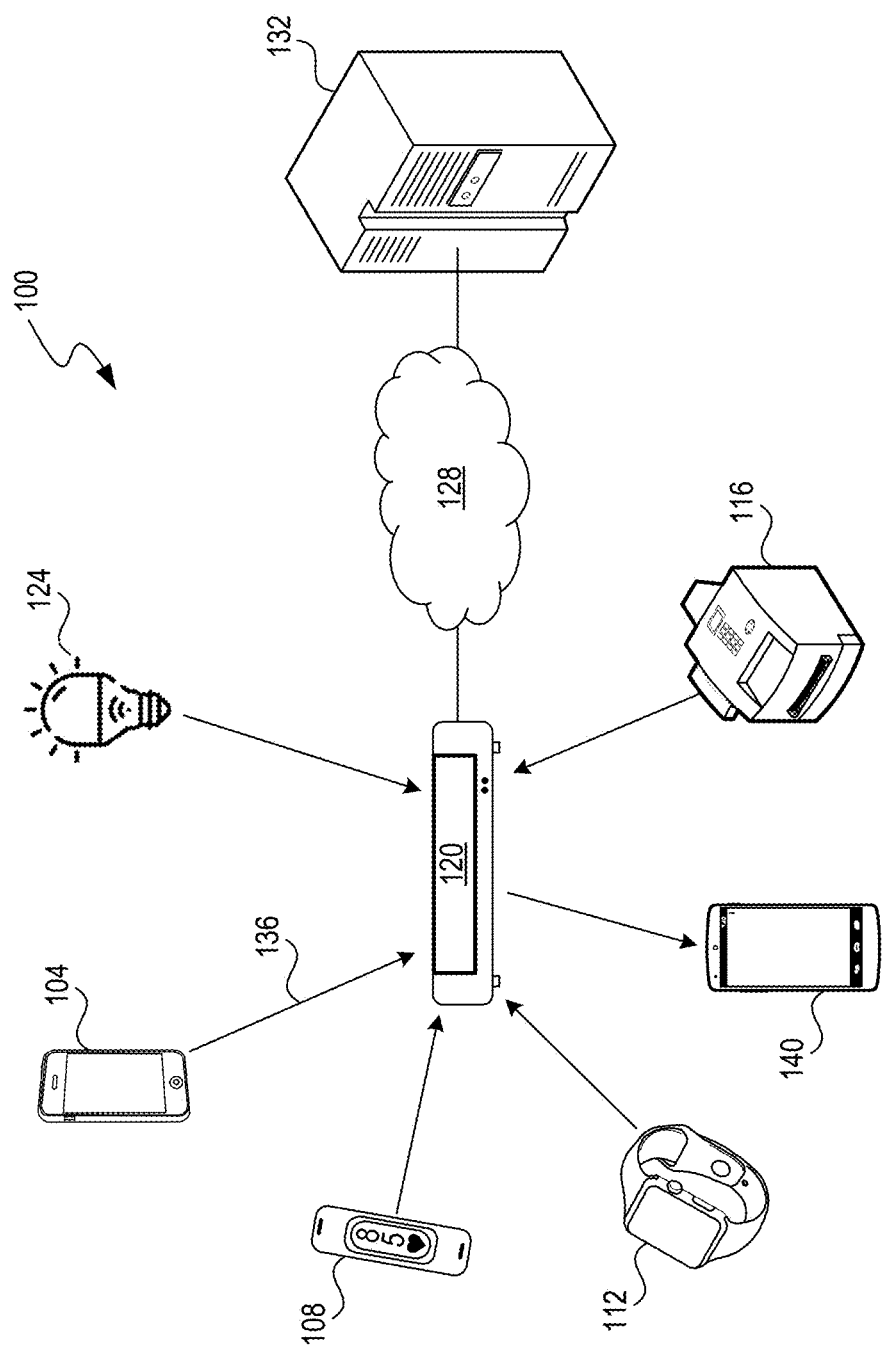
FIG. 1 is a block diagram that illustrates an example system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

This document discloses methods, systems, and apparatuses for improved detection of electronic device presence. The disclosed methods can be performed for counting a number of unique electronic devices present in a home or business, or within some other geographical area, based on analysis of passive Bluetooth Low Energy (BLE) signals. In some implementations, other types of signals such as cellular signals and/or Wi-Fi probe requests are used. Counting RF- and, more specifically, Bluetooth-enabled devices, improves private and public security in determining human presence. Some methods disclosed herein are deterministic and leverage BLE properties. The methods disclosed herein are simpler and have lower computational cost than traditional approaches, which rely on power level clustering.

Methods are disclosed to identify and/or count a number of unique electronic devices present in an area using emitted passive Bluetooth Low Energy (BLE) signals. Bluetooth-enabled devices passively emit BLE signals for inter-device communication in the form of Bluetooth Advertising Packets. The packets are sent by BLE-enabled devices to search for other compatible BLE devices. The packets advertise information such as media access control (MAC) addresses, device manufacturers, connection capabilities, and manufacturer-specific data. By listening for active as well as passive signals emitted by devices, the disclosed apparatuses collect pseudonymous attributes and identifiers from devices and networks. By passively listening to and decoding the observed BLE signals, access to the packets and the metadata they contain is gained. The disclosed methods can include use of other wireless data transfer protocols, such as Wi-Fi and cellular. For example, sensed device activity can include Wi-Fi signaling, cellular signaling, network discovery, and Wi-Fi fingerprinting.

In some embodiments, a computer system detects presence of one or more electronic devices in proximity to a Bluetooth receiver. The computer system includes at least one hardware processor and at least one non-transitory computer-readable storage medium. The storage medium stores instructions, which are executed by the hardware processor. The instructions cause the computer system to receive multiple Bluetooth Advertising Packets via the Bluetooth receiver. The BLE signals are emitted by the one or more electronic devices. The Bluetooth Advertising Packets include multiple media access control (MAC) addresses including primary MAC addresses of the electronic devices and secondary MAC addresses of the electronic devices. For example, each Bluetooth Advertising Packet has a single MAC address. However, an electronic device can emit multiple concurrent Bluetooth Advertising Packets, which can have different MAC addresses. In some examples, two MAC addresses (a primary MAC address and a secondary MAC address) are emitted by an electronic device concurrently.

The computer system determines which of the multiple MAC addresses are the primary MAC addresses based on hexadecimal character sequences extracted from metadata fields of the Bluetooth Advertising Packets. The computer system determines that some of the electronic devices rotated from broadcasting a first set of the primary MAC addresses to a second set of the primary MAC addresses (to avoid double counting the electronic devices) based on the hexadecimal character sequences. The computer system determines the number of unique electronic devices based on the number of unique primary MAC addresses. Double counting of the electronic devices is avoided by ignoring secondary MAC addresses. In some examples in which an electronic device rotates its primary MAC address, the computer system considers only the second primary MAC address to avoid double counting. In some examples, the computer system determines a number of the unique electronic devices present based on the second set of the primary MAC addresses (e.g., when all electronic devices rotated their primary MAC devices). The computer system transmits the number of the unique electronic devices to a user device. An application executes on the user device to generate a graphical representation on a screen of the user device. The graphical representation describes the electronic devices present in proximity to the Bluetooth receiver.

In some embodiments, a computer-implemented method is performed for detecting presence of one or more electronic devices. The method includes receiving, via a Bluetooth receiver, multiple BLE signals broadcast by the electronic devices. A machine learning (ML) model is used to filter the BLE signals to provide a set of the BLE signals broadcast by a set of the electronic devices having device types that are supported for counting a number of the unique electronic devices present. The set of the BLE signals includes multiple primary MAC addresses and at least one secondary MAC address broadcast by the set of the electronic devices. The at least one secondary MAC address is excluded from consideration for detecting presence of the set of the electronic devices. The at least one secondary MAC address is excluded based on hexadecimal character sequences extracted from metadata fields of the set of the BLE signals. The set of the electronic devices is determined to have rotated from broadcasting a first set of the primary MAC addresses to a second set of the primary MAC addresses based on timestamps of the primary MAC addresses. A number of unique electronic devices in the set of the electronic devices is determined based on the number of unique primary MAC addresses. In some examples, the number of unique electronic devices in the set of the electronic devices is determined based on the second set of the primary MAC addresses (e.g., when all electronic devices in the set rotated their primary MAC addresses). The number of the set of the electronic devices is sent to a user device.

In some embodiments, at least one non-transitory computer-readable storage medium stores instructions, which are executed by at least one hardware processor of a computer system. The instructions cause the computer system to receive multiple primary MAC addresses and at least one secondary MAC address broadcast by one or more electronic devices. The MAC addresses are received via a Bluetooth receiver. The primary MAC addresses are identified based on hexadecimal character sequences extracted from metadata fields of BLE signals received via the Bluetooth receiver. In some examples, the electronic devices are determined to have rotated from broadcasting a first set of the primary MAC addresses to a second set of the primary MAC addresses based on the hexadecimal character sequences. The number of unique electronic devices present is determined based on the data available to the computer system. In some examples, the computer system decodes the rotation of MAC addresses to improve the accuracy of the prediction and to avoid double counting the same electronic devices. In some examples, a number of the unique electronic devices is determined based on the second set of the primary MAC addresses (e.g., when all electronic devices rotated their primary MAC addresses). The number of the electronic devices is sent to a user device.

The benefits and advantages of the implementations described herein include real-time and more accurate insights into people's and devices' presence. Because mobile electronic devices are a strong indication of presence, the disclosed methods for detection and identification reduce unnecessary alerts and costly false-alarm dispatches. By adding known devices to their profiles, users obtain increased insight into when an electronic device enters their homes and whom it belongs to. The disclosed systems therefore provide value outside of security threats, informing busy homeowners when teens arrive safely from school, if a nanny is late, or if other home awareness concerns arise. The disclosed apparatuses can be used as a standalone solution or as an addition to existing security systems to reduce false detections and enhance the context of alerts.

The identification and/or counting of Bluetooth-enabled devices improves private and public security in determining human presence. The disclosed methods augment device detection with context determined through artificial intelligence (AI) using both real-world and synthetically-generated data to expand anomaly detection and overall understanding of presence. The radio frequency signals detected are transformed using AI into valuable insights and actionable data. Moreover, the disclosed cloud infrastructure is architected to process raw data and scale in real-time. The cloud infrastructure provides a backbone to the presence detection ecosystem, translating raw data to insights at high levels of reliability, efficiency, and accuracy.

The disclosed data ecosystem is enriched with multiple insights and scenarios to enhance precision using the collected signal data. In some implementations, the data ecosystem is enriched with insights synthetically using a synthetic data generation platform, which can simulate multiple scenarios, equipping the data platform to process highly probable as well as improbable situations with accuracy. The disclosed cloud IoT platform provides updates to the computer devices and sensors (e.g., software, firmware, OS, or kernel updates), monitors the health of computer devices and sensors in real-time, and adapts the system's performance using specialized microservices. For example, a unique cloud environment and encryption codes are created for each computer device to support data privacy and security.

Moreover, operation of the disclosed apparatuses causes a reduction in greenhouse gas emissions compared to traditional methods for presence detection. Every year, approximately 40 billion tons of $CO^2$ are emitted around the world. Power consumption by digital technologies including home and business security systems accounts for approximately 4% of this figure. Further, conventional security systems can sometimes exacerbate the causes of climate change. For example, conventional security systems that use video capture and storage increase the amount of data stored in and downloaded from datacenters. In the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Avoiding data-intensive video capture and storage using Wi-Fi signaling, cellular signaling, Bluetooth signaling, network discovery, and/or Wi-Fi fingerprinting reduces the amount of data transported and stored, and obviates the need for wasteful $CO^2$ emissions.

The disclosed implementations for translating Bluetooth and Wi-Fi signaling data to insights at high levels of efficiency mitigates climate change and the effects of climate change by reducing the amount of data stored and downloaded in comparison to conventional technologies. The implementations disclosed herein for listening to passive BLE signals emitted by devices can mitigate climate change by reducing and/or preventing additional greenhouse gas emissions into the atmosphere. In particular, by reducing unnecessary alerts and costly false-alarm dispatches, the disclosed systems provide increased efficiency compared to traditional methods.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

FIG. 1 is a block diagram that illustrates an example system 100 that can implement aspects of the present technology. The system 100 includes electronic devices 104, 108, 112, 116, 124, a user device 140, a computer device 120, a network 128, and a cloud server 132. Likewise, implementations of the example system 100 can include different and/or additional components or be connected in different ways. The system 100 is implemented using components of the example computer system 700 illustrated and described in more detail with reference to FIG. 7.

The system 100 provides a framework for detecting presence of electronic devices (e.g., electronic devices 104, 108) using passive Bluetooth Low Energy (BLE) signals. In some implementations, other types of signals such as cellular signals and/or Wi-Fi probe requests are used. Example BLE signals 300 are illustrated and described in more detail with reference to FIG. 3. Bluetooth is a wireless personal area networking standard for exchanging data over short distances. BLE is a power- and application-friendly version of Bluetooth built for the Internet of Things (IoT). BLE is delivered native on many electronic devices. BLE signals include Bluetooth Advertising Packets (e.g., broadcasting, discovery, advertisement parameters, and/or advertisement data). The BLE signals emitted by electronic devices can include connectable undirected advertising, connectable directed advertising, non-connectable undirected advertising, and scannable undirected advertising.

Bluetooth-enabled devices passively emit BLE signals used for inter-device communication in the form of Bluetooth Advertising Packets. These packets are sent by BLE-enabled devices to search for other known or compatible nearby BLE devices and advertise information such as MAC address, device manufacturer, connection capabilities, and/or manufacturer specific data. By passively listening to the relevant frequencies, computer device 120 and/or cloud server 132 can decode the observed signals, and gain access to the packets and the metadata they contain. The system 100 can use a trained machine learning (ML) model that learns relationships between real-time BLE broadcast behavior and the number of unique electronic devices 104, 108 present. The ML model can be implemented using the components illustrated and described in more detail with reference to FIG. 6.

The disclosed methods for device counting have applications across different industry segments because they enable tracking the presence and movement of people in an area. System 100 can be used, for example, for public and private security systems in detecting unwanted presence, logistics, and monitoring of public transportation, and even for commercial venues to understand foot-traffic patterns. The methodology performed by system 100 is extensible to other wireless data transfer protocols, such as Wi-Fi and cellular.

The system 100 can be used to perform a computer-implemented method for detecting presence of the electronic devices 104, 108 in proximity to a Bluetooth receiver (e.g., located within computer device 120). In some implementations the computer-implemented method for detecting presence of the electronic devices 104, 108 is performed using computer device 120 and/or cloud server 132. Computer device 120 is sometimes referred to as a "sensor." Computer device 120 can be a networking hardware device, an application-specific electronic device, a smartphone, a laptop, a desktop, a tablet, a smoke detector, a Wi-Fi access point, a router, a security panel, or any other device capable of receiving Bluetooth signals and performing computation. Computer device 120 may or may not be connected to a Wi-Fi network. Computer device 120 includes a Bluetooth receiver (sometimes referred to as a Bluetooth receiver circuit) that can receive passive Bluetooth signals such as BLE signals sent from electronic devices 104, 108 located in proximity to the computer device 120 even when the electronic devices 104, 108 do not have a Bluetooth connection to the computer device 120.

Electronic device 104 is a smartphone. Electronic device 108 is a wearable fitness device that is Bluetooth capable. Electronic device 112 is a wearable device, such as a smartwatch, that is Bluetooth capable. Electronic device 116 is an Internet of Things (IoT) device, such as a smart printer, that is Bluetooth capable. Electronic device 124 is a smart device, such as a smart bulb, that is Bluetooth capable. Electronic devices 104, 108, 112, 116, 120 can have different makes and/or models. User device 140 is a smartphone, tablet, laptop, or desktop capable of communicating with the computer device 120 and/or the cloud server 132. The computer device 120 is connected to the cloud server 132 via network 128, which can be a Wi-Fi network, the Internet, or a cellular network. The network 128 can be implemented using example network 714 illustrated and described in more detail with reference to FIG. 7. The disclosed methods monitor a wide range of wireless protocols and devices, providing insights into the presence and behavior of IoT devices. The systems disclosed herein can therefore address the challenges posed by the proliferation of IoT devices, and keep track of electronic devices and their activities.

The disclosed systems can determine a count of the electronic devices 104, 108 present based on (but not exclusive to) passive Bluetooth signals, such as Bluetooth Advertising Packets. By passively listening to the broadcasted Bluetooth Advertising Packets, a computer system (e.g., computer device 120 and/or cloud server 132) analyzes the BLE signals, and predicts the number of unique electronic devices 104, 108 present. To initialize and train the computer system, multiple electronic devices are each isolated in a Faraday cage for measurement and analysis of Bluetooth signals emitted by only one device at a time. Each device advertises BLE signals at intervals. For example, a particular device was found to broadcast predominantly at intervals of two seconds. Therefore, when longer times between signals are observed for such a device in functional operation, it could be due to either missed packets or pauses in advertising. Other devices can broadcast at intervals of five seconds. Hence, signals from electronic devices having longer advertisement intervals (e.g., AirPods™) can be filtered out if desired.

In some implementations, a computer-implemented method is performed for detecting presence of one or more electronic devices. Multiple BLE signals broadcast by the electronic devices 104, 108 are received via a Bluetooth receiver (e.g., located within computer device 120). In some implementations, at least one non-transitory computer-readable storage medium (e.g., within computer device 120 and/or cloud server 132) stores instructions that are executed by at least one hardware processor of a computer system.

The instructions cause the computer system to receive multiple primary media access control (MAC) addresses via a Bluetooth receiver. At times, at least one secondary MAC address is also received. The primary and secondary MAC addresses are broadcast within BLE signals by one or more electronic devices 104, 108. An example primary MAC address 216 and an example secondary MAC address 212 broadcast by an example electronic device 208 (an iPhone XR™) are illustrated and described in more detail with reference to FIG. 2.

The computer system receiving the BLE signals can be computer device 120 and/or cloud server 132. An electronic device can emit BLE signals whether or not it is connected to another electronic device via Bluetooth. In some examples, at least one of the electronic devices (e.g., electronic device 104) that broadcasts BLE signals lacks a Bluetooth connection to another BLE-capable device (e.g., electronic device 124) in proximity to the electronic device. For example, electronic device 104 emits BLE signals to search for and connect to electronic device 124. In some implementations, particular types of electronic devices (e.g., IoT devices) are not supported by the computer system for counting a number of the unique electronic devices present. MAC addresses emitted by the electronic devices can be filtered to remove MAC addresses associated with unsupported device types.

An ML model can be used to filter the BLE signals collected. The filtering provides a set of the BLE signals broadcast by a set of the electronic devices that has supported device types. The device types are supported for counting a number of the unique electronic devices present. For example, a computer system (computer device 120 and/or cloud server 132) uses a trained ML model to remove at least one MAC address from the multiple MAC addresses received from the electronic devices 104, 108. The MAC addresses (that are removed from the multiple MAC address received) are broadcast by electronic devices having device types unsupported for counting a number of the unique electronic devices present.

The MAC addresses associated with unsupported device types can be removed from the multiple MAC addresses received based on analyzing hexadecimal character sequences embedded in the received BLE signals. Example hexadecimal character sequences 308, 316 are illustrated and described in more detail with reference to FIG. 3. For example, an ML classifier is used to determine whether a certain BLE signal was emitted from a supported smartphone type or from a different device type (e.g., electronic device 108). In this example, the BLE signals emitted by supported smartphones are retained to provide the set of the BLE signals. The ML model can be implemented using the components and methods illustrated and described in more detail with reference to FIG. 6.

Information extracted from the Bluetooth Advertising Packets is used as features to train the ML model as well as to determine the number of unique electronic devices present. In some examples, the advertised manufacturer name broadcast by an electronic device is used as a feature. In some examples, the nature of the advertised MAC is used as a feature, such as whether the advertised MAC is public or random. In some examples, data values of fields in a Bluetooth Advertising Packet Extended Inquiry Response are used. For example, data values of flags, transmitter power levels, and Manufacturer Specific Data can be used. The hexadecimal character sequences described herein are extracted from the Manufacturer Specific Data field described above. Relevant bytes that contain useful information and which are beneficial for predicting the device type emitting this information are also extracted to be used as features.

In some implementations, an ML model is trained by identifying the information and features that are relevant and predictive of a device type of an electronic device emitting a particular Bluetooth Advertising Packet. ML training methods are described in more detail with reference to FIG. 6. Different ML architectures that beneficially use the input feature values to determine the respective device types can be selected. In some examples, the hyper-parameters of ML models are tuned to derive an ML model that performs at above performance thresholds.

The set of the BLE signals retained (after removing BLE signals collected from unsupported devices) can include multiple primary MAC addresses and at least one secondary MAC address broadcast by the set of the electronic devices. The primary MAC addresses are used to determine a count of the unique electronic devices present. The count of the unique electronic devices present is sent from the computer system (computer device 120 and/or cloud server 132) to the user device 140 via a cellular connection, a Wi-Fi connection (e.g., via network 128), or by Bluetooth.

Figure 2:
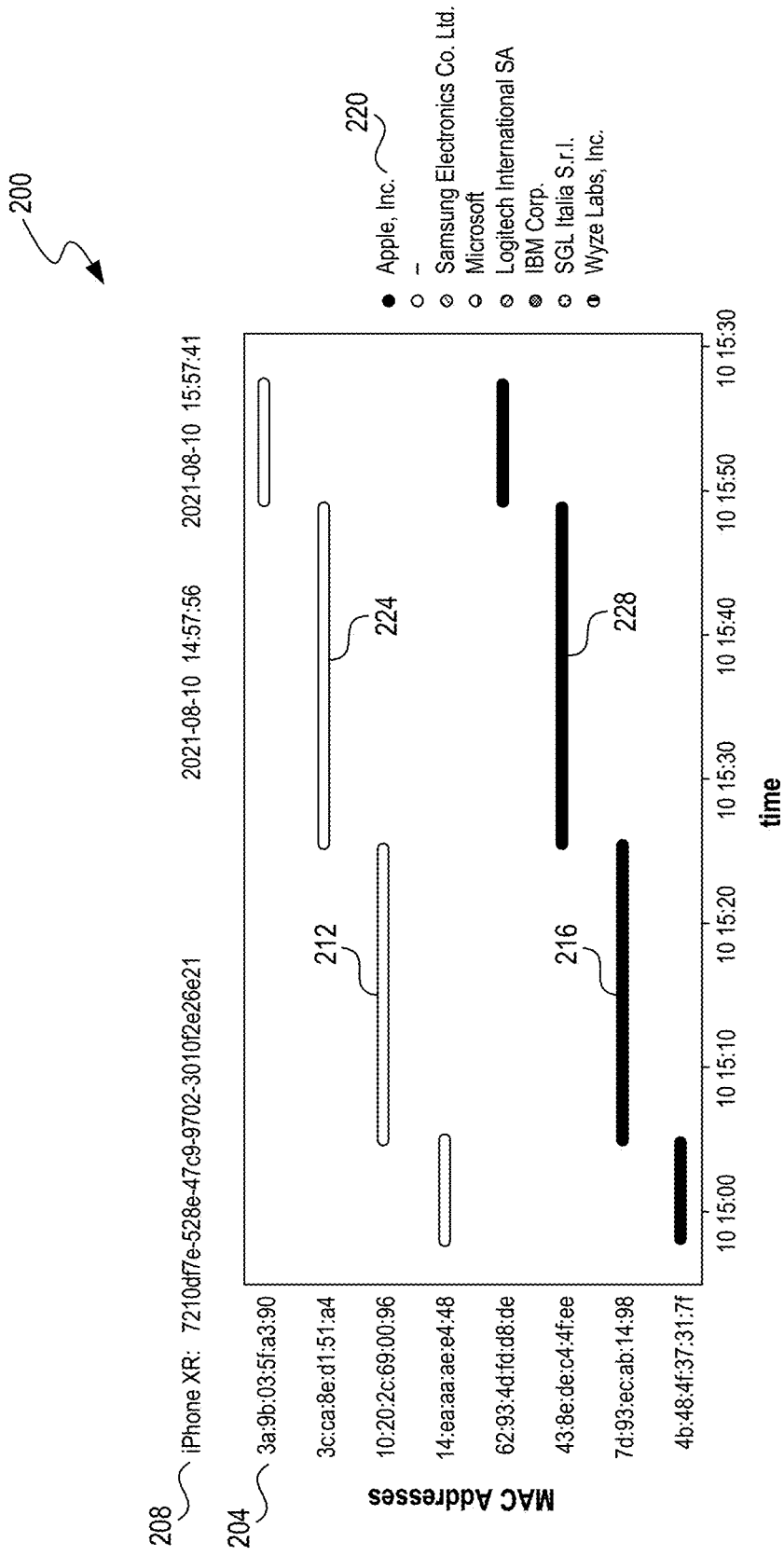
FIG. 2 is a drawing that illustrates example media access control (MAC) addresses emitted by an electronic device.

FIG. 2 is a drawing that illustrates example media access control (MAC) addresses 204, 212, 216, 224, 228 emitted by an electronic device 208. In some implementations as disclosed herein, a computer system (e.g., computer device 120 and/or cloud server 132) detects presence of one or more electronic devices (e.g., devices 104, 108 shown by FIG. 1) when they are in proximity to a Bluetooth receiver. In some implementations, a Wi-Fi receiver or cellular signals receiver is used. For example, the computer system includes at least one hardware processor and at least one non-transitory computer-readable storage medium storing instructions. The instructions are executed by the at least one hardware processor to cause the computer system to receive, via a Bluetooth receiver, multiple Bluetooth Advertising Packets emitted by the one or more electronic devices, and determine a count of the one or more electronic devices. In some implementations, other types of signals such as cellular signals and/or Wi-Fi probe requests are used.

The implementations disclosed herein can defeat "MAC address randomization," as well as segment devices into unique categories based on BLE behavior. In addition, "secondary" MAC addresses are filtered out. A "secondary MAC address" refers to a MAC address emitted by an electronic device that doesn't necessarily signify the electronic device's presence (i.e., a device will always emit its primary MAC address, and it may also but not necessarily emit secondary MAC addresses). FIG. 2 shows example behavior of an electronic device 208 that emits multiple MAC addresses simultaneously. The MAC addresses broadcast are shown by the Y-axis, and the time on the X-axis. Advertised manufacturer names 220 (for other possible devices) are also shown. FIG. 2 plots the behavior of an iPhone XR™ for about an hour, and shows how the same electronic device 208 emits two different MAC addresses (e.g., MAC addresses 212, 216) at different times.

Each MAC address is a unique identifier assigned to a network interface controller for use as a network address in communications within a network segment. MAC addresses are used by electronic devices for most IEEE 802 networking technologies, including Ethernet, Wi-Fi, and Bluetooth. For example, MAC address 204 is a 12-digit hexadecimal number assigned to electronic device 208. A MAC address can be specified as a unique identifier during device manufacturing. A MAC address may be required when trying to locate a device or when performing diagnostics on a network device.

Each MAC address 204, 216 is associated with a data link layer of the Open Systems Interconnection (OSI) model, which encapsulates the MAC address of the source and destination in the header of each data frame to ensure node-to-node communication. Each network interface in a device is assigned a unique MAC address, hence a device can have more than one MAC address. For example, if a laptop has both an Ethernet cable port and built-in Wi-Fi, there will be two MAC addresses shown in the system configuration. FIG. 2 shows a plot 200 of MAC addresses 204, 212, 216, 224, 228 emitted by electronic device 208 (an iPhone XR™) over time (e.g., from 14:57:56 to 15:57:41) on Aug. 10, 2021 in a measured experiment in accordance with aspects of the disclosed methodologies. Different electronic devices manufactured by different manufacturers 220 as well as different types of electronic devices (e.g., electronic devices 104, 108, 112 shown by FIG. 1) can be used by the disclosed methodologies.

Bluetooth enabled devices exhibit varied behavior in the way they emit advertising packets and search for other Bluetooth-capable devices. This behavior can be generally grouped into different categories. Some electronic devices emit advertising packets using a small group of similar MAC addresses, and rarely rotate MAC addresses. Some electronic devices do not emit passive Bluetooth signals at a regular cadence or at a regular frequency. Some electronic devices emit different MAC addresses concurrently and rotate every few minutes. The electronic devices that emit different MAC addresses concurrently and rotate MAC addresses can pose a challenge to resolving an accurate count of the present devices. The methods disclosed herein track such devices over time by defeating MAC address randomization based on rotation timestamps and manufacturer-specific data value similarity in metadata fields specified by the BLE protocol.

As shown by FIG. 2, the electronic device 208 broadcasts a primary MAC address 216 as well as a secondary MAC address 212 simultaneously within BLE signals from around 15:05 to around 15:25. Example captured BLE signals 300 are illustrated and described in more detail with reference to FIG. 3. The electronic device 208 broadcasts a different (rotated) primary MAC address 228 as well as a different (rotated) secondary MAC address 224 simultaneously within BLE signals starting at around 15:25.

In some implementations as described in more detail with reference to FIG. 1, some types of electronic devices (e.g., IoT devices) are not supported for the purpose of counting the number of unique devices present. For example, it is unlikely that IoT devices will be carried by an unauthorized person into a home or business, and hence a computer system can reduce processing complexity by not supporting counting of such electronic device types. In such implementations, the computer system determines that such types of electronic devices are present but does not proceed further for analyzing their primary and secondary MAC addresses and/or does not proceed to determine digital identities of the unsupported electronic devices.

To detect the presence of unsupported devices within the BLE signals collected, the computer system can filter the BLE signals by extracting a feature vector from the BLE signals. Feature extraction is described in more detail with reference to FIG. 2. The feature vector extracted from the BLE signals is indicative of device types of the electronic devices. The computer system uses the ML model to provide the set of the BLE signals (filtered version of the collected BLE signals) based on the feature vector. In some implementations, the ML model is trained using previously collected Bluetooth Advertising Packets to identify supported and unsupported device types.

For training the ML model, samples of Bluetooth Advertising Packets are collected for different device types and different device manufacturers. The collected samples are used to train the ML model to differentiate between, e.g., how an iPhone™ emits Bluetooth Advertising Packets vs. how a Bluetooth speaker or Android device emits BLE signals. Data is collected from a variety of types of devices across different manufacturers and models. A training set is constructed to train the ML model to differentiate between devices. Example training methods are described in more detail with reference to FIG. 6. The ML model is trained to learn what information is relevant to predict the different device types. The ML model can be trained to focus on differentiating between smartphones vs. other devices. Different ML models are fit, and different architectures and hyper-parameters are explored to select a beneficial ML model.

The Bluetooth Advertising Packets include multiple MAC addresses 212, 216, 224, 228 including primary MAC addresses 216, 228 of the electronic devices and secondary MAC addresses 212, 224. In some implementations, the computer system identifies the primary MAC addresses 216, 228 based on hexadecimal character sequences extracted from metadata fields of the Bluetooth Advertising Packets. Example hexadecimal character sequences 308, 316 are illustrated and described in more detail with reference to FIG. 3. The computer system can determine which of the multiple MAC addresses 212, 216, 224, 228 are the primary MAC addresses by analyzing the hexadecimal character sequences extracted from the metadata fields of the Bluetooth Advertising Packets.

To identify secondary MAC addresses, the computer system differentiates between primary and secondary MAC addresses using a Manufacturer Specific Data field of an Extended Inquiry Response. For example, an electronic device having Bluetooth capability turned on emits a primary MAC address, and can sometimes emit multiple MAC addresses concurrently. Each MAC address is typically emitted in a different Bluetooth Advertising Packet. A single MAC address emitted by an electronic device or one of a group of MAC addresses concurrently emitted by the electronic device typically begins with the same hexadecimal characters for the Manufacturer Specific Data field. The primary MAC address is the MAC address whose Manufacturer Specific Data field begins with these hexadecimal characters (sometimes referred to as an "identified flag.") The other MAC addresses in the group are the secondary MAC addresses (e.g., secondary MAC addresses 212, 224).

The implementations disclosed herein identify and filter out secondary MAC addresses by searching for specific sequences of hexadecimal characters found in metadata fields within the Bluetooth Advertising packets. For example, the secondary MAC addresses 212, 224 are removed from the collected MAC addresses 216, 224, 228 for detecting presence of a unique set of the electronic devices. The secondary MAC addresses 212, 224 are removed based on analyzing hexadecimal character sequences associated with the secondary MAC addresses 212, 224 extracted from the metadata fields of the Bluetooth Advertising Packets.

In some implementations, the computer system determines the makes and/or models (e.g., manufacturers 220) of the electronic devices based on the extracted hexadecimal character sequences. For example, sequences 308, 316 shown by FIG. 3 indicate manufacturer data. Information describing the makes and/or models is sent to a user device (e.g., user device 140 shown by FIG. 1). To identify different makes and models of electronic devices (e.g., iPhone 12™ vs. iPhone 14™, or iPhone™ vs. Samsung™) the computer system uses a similar method or the same method it uses when differentiating between different device types (e.g., smartphone vs. Bluetooth speaker). For example, the features extracted from the BLE signals are used to train an ML model using different target categories. The different makes/models of electronic devices are identified from the feature vectors extracted from each Bluetooth Advertising Packet by running the feature vectors through the trained ML model.

FIG. 3 is a drawing that illustrates example MAC address rotation. In some implementations, other types of signals such as cellular signals and/or Wi-Fi probe requests are used. MAC address rotation or randomization refers to the changing of an electronic device's MAC address, e.g., from a first MAC address 304 to a second MAC address 312. Example electronic devices 104, 108 are illustrated and described in more detail with reference to FIG. 1. Example MAC address rotation is also shown by plot 200 of FIG. 2, in which device 208 rotated from broadcasting MAC addresses 212, 216 to MAC addresses 224, 228. Device manufacturers implemented the MAC address rotation feature to protect user privacy and as a result, a single electronic device broadcasting MAC addresses 304, 312 can appear as several devices when examining MAC addresses 304, 312 alone.

The methods disclosed herein filter out MAC addresses (e.g., MAC address 304) that rotated and stopped being broadcast. MAC addresses for the BLE protocol generally rotate every 15-20 minutes. This cadence is different from other protocols such as Wi-Fi probe requests, which usually rotate MAC addresses within seconds. The longer BLE cadence and MAC address rotation timestamps are used to determine the MAC address (e.g., MAC address 312) to which a device rotated. For example, an electronic device can be determined to have rotated from MAC address A to MAC address B if that was the only MAC address rotation that occurred within a small time frame (e.g., one second or a few seconds). However, as the number of present devices increases, the likelihood that multiple devices rotate MAC addresses within the same few seconds increases. In scenarios where multiple MAC address rotations are observed within a timeframe (for example, within the same 1-2 seconds), the similarity of data values in other metadata fields within the advertising packets is leveraged to identify MAC address pairs with a high likelihood of belonging to the same device.

For example, FIG. 3 shows a device rotating a MAC address 304 to MAC address 312, and that the value of the metadata 308 represented in the manufacturer_data field is the same before and after the rotation (see hexadecimal character sequence 316). By such tracking, a computer system can determine that MAC address 304 (79:ec:ca:c3:c0:8a) rotated to MAC address 312 (78:53:15:e4:bc:8e), and both MAC addresses 304, 312 belong to the same electronic device. Advertising packets may not always include the same value in the manufacturer_data field before and after rotation. In such cases, a MAC address in BLE packets having the most similar metadata values to previous BLE packets is determined to be the MAC address that a device rotated to (when multiple MAC addresses rotated around the same time).

For example, a computer system (e.g., computer device 120 and/or cloud server 132 shown by FIG. 1) receives BLE signals 300 via a Bluetooth receiver, as described in more detail with reference to FIG. 1. The BLE signals are emitted by one or more electronic devices. To determine presence of the electronic devices and count the unique number of electronic devices present, the computer system determines that the electronic devices rotated from broadcasting a first set of primary MAC addresses 304 to a second set of primary MAC addresses 312, 332, 340. The determination is based on analyzing hexadecimal character sequences 308, 316 extracted from the BLE signals 300. The BLE signals 300 are emitted by the electronic devices and captured via a Bluetooth receiver (e.g., within computer system 120 shown by FIG. 1). For example, the computer system determines that the same electronic device rotated from broadcasting the MAC address 304 to the MAC address 312 based on matching the hexadecimal character sequence 308 associated with the MAC address 304 to the hexadecimal character sequence 316 associated with the MAC address 312.

In some implementations, the computer system identifies the second set 312, 332, 340 of the primary MAC addresses based on manufacturer data (e.g., hexadecimal character sequence 308) extracted from metadata fields of the BLE signals 300. The computer system determines that MAC addresses 332, 340 in the second set of the primary MAC addresses are broadcast by electronic devices different from the electronic device that broadcast the MAC addresses 304, 312. This determination can be made based on hexadecimal character sequences in the BLE signals 300 and/or timestamps 320, 324, 328, 336.

In some examples, an electronic device broadcasting a first MAC address 304 has a higher likelihood of being the same device as an electronic device broadcasting a second MAC address 312 if the manufacturer data (e.g., hexadecimal character sequences 308, 316) extracted from the BLE signals associated with both electronic devices is the same or similar. In some implementations, the computer system extracts a first data value (e.g., hexadecimal character sequence 308) from the BLE signals emitted by an electronic device and a second data value (e.g., hexadecimal character sequence 316) from the BLE signals. The computer system determines that a particular one of the electronic devices broadcast a particular one (e.g., MAC address 304) of the first set of primary MAC addresses and a particular one (e.g., MAC address 312) of the second set of the primary MAC addresses based on matching the first data value to the second data value.

In some implementations, the computer system links rotated MAC addresses 304, 312 as belonging to a single electronic device to determine if the device has been present for a significant amount of time. For example, the timestamps 320, 324, 328, 336 are used. To link MAC addresses as belonging to a unique device, the computer system analyzes characteristics (e.g., sequences 308, 316) of the BLE traces that have not changed. For example, BLE signal strength or broadcast advertisement profile is used. In some embodiments, a match score is determined between a first advertisement signal broadcast from a device and a second advertisement signal broadcast from the device. For example, the difference between mean Received Signal Strength Indicator (RSSI) strength, RSSI standard deviation, and mean advertising interval (e.g., between timestamps 320, 324) is used.

In some implementations, the computer system determines that a set of electronic devices rotated from broadcasting a first set of primary MAC addresses 304 to a second set 312, 332, 340 of the primary MAC addresses based on timestamps 320, 324, 328, 336 of the primary MAC addresses. For example, the computer system determines that an electronic device rotated from broadcasting a first MAC address 304 to a second MAC address 312 by analyzing a cadence of rotation of the MAC addresses based on the timestamps 320, 324. To analyze MAC address rotation, the computer system senses when a first MAC address is no longer being emitted. Once a MAC address is no longer being received by the Bluetooth receiver, the computer system searches for a second MAC address in the received BLE signals that replaced the first MAC address that is no longer being emitted. If the computer system cannot detect a second MAC address in the received BLE signals that replaced the first MAC address, the computer system can make a determination that the electronic device that emitted the first MAC address is no longer within range of the Bluetooth receiver. A MAC address is typically emitted for 15-20 minutes by a smartphone. In some examples, when the computer system observes a new MAC address "B" being emitted after another MAC address "A" stops being emitted, and MAC B is observed for 15-20 minutes, the computer system determines with a confidence level greater than a threshold confidence level that MAC A rotated to MAC B. The threshold confidence level can be 90%, 95%, 99%, etc.

The computer system determines a number of the unique electronic devices present in proximity to the Bluetooth receiver based on the second set of the primary MAC addresses 312, 332, 340. The number of the supported set of electronic devices present is sent to a user device (e.g., user device 140 shown by FIG. 1).

Figure 4:
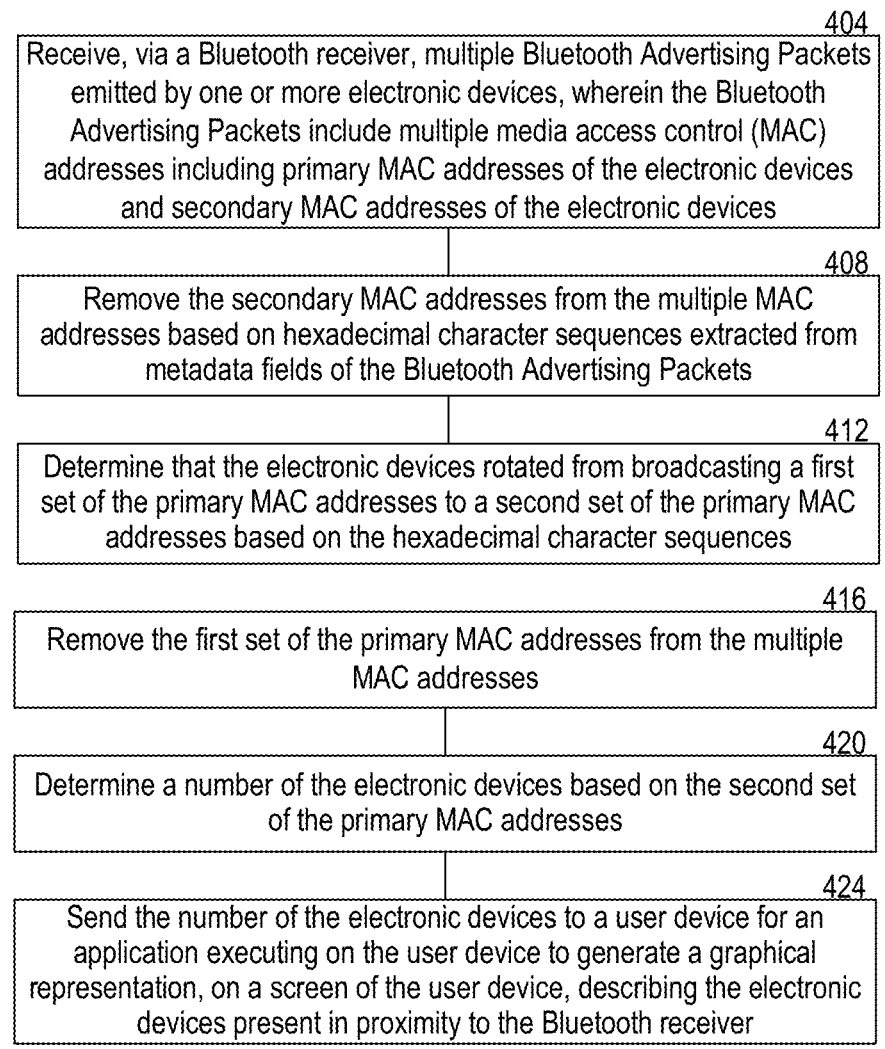
FIG. 4 is a flow diagram that illustrates an example process for detecting presence of electronic devices.

FIG. 4 is a flow diagram that illustrates an example process for detecting presence of electronic devices. In some implementations, the process is performed by computer device 120 and/or cloud server 132 illustrated and described in more detail with reference to FIG. 1. In some implementations, the process is performed by a computer system, e.g., example computer system 700 illustrated and described in more detail with reference to FIG. 7. Particular entities, for example, AI system 600, perform some or all of the steps of the process in other implementations. The AI system 600 is illustrated and described in more detail with reference to FIG. 6. Likewise, implementations can include different and/or additional steps or can perform the steps in different orders.

In act 404, a computer system receives multiple Bluetooth Advertising Packets emitted by one or more electronic devices. In some implementations, other types of signals such as cellular signals and/or Wi-Fi probe requests are used. Example electronic devices 104, 108, 112, 116, 124 are illustrated and described in more detail with reference to FIG. 1. The Bluetooth Advertising Packets are received via a Bluetooth receiver. The process shown by FIG. 4 detects presence of and counts a unique number of the one or more electronic devices present in proximity to the Bluetooth receiver. A significant challenge posed by traditional security systems is maintaining privacy while ensuring safety. The disclosed technology accomplishes privacy objectives by analyzing passive radio frequency (RF) signals, eliminating the need for intrusive cameras or microphones in homes or workplaces.

The Bluetooth Advertising Packets can include multiple MAC addresses including primary MAC addresses of the electronic devices and secondary MAC addresses of the electronic devices. Example primary MAC addresses 216, 228 and example secondary MAC addresses 212, 224 broadcast by an example device 208 (an iPhone XR™) are illustrated and described in more detail with reference to FIG. 2. The computer system determines which of the multiple MAC addresses are the primary MAC addresses based on hexadecimal character sequences extracted from metadata fields of the Bluetooth Advertising Packets. Example primary MAC addresses 304, 312, 332, 340 and example hexadecimal character sequences 308, 316 are illustrated and described in more detail with reference to FIG. 3. In act 408, the computer system removes the secondary MAC addresses from the multiple MAC addresses collected based on hexadecimal character sequences extracted from metadata fields of the Bluetooth Advertising Packets.

In act 412, the computer system determines that the electronic devices present rotated from broadcasting a first set of the primary MAC addresses to a second set of the primary MAC addresses based on the hexadecimal character sequences. An example first set 304 of the primary MAC addresses and an example second set 312, 332, 340 of primary MAC addresses are illustrated and described in more detail with reference to FIG. 3.

In act 416, the computer system removes the first set (e.g., MAC address 304 shown by FIG. 1) of the primary MAC addresses from the multiple MAC addresses collected. In act 420, the computer system determines a number of the unique electronic devices present in proximity to the Bluetooth receiver, based on the second set (e.g., MAC addresses 312, 332, 340) of the primary MAC addresses. In some implementations, determining the number of the unique electronic devices present based on the second set of the primary MAC addresses causes a reduction in greenhouse gas emissions compared to storing video images captured by cameras in proximity to the electronic devices. For example, the power efficiency and low energy functionality of BLE make this protocol beneficial for detecting presence of battery-operated devices.

Figure 5:
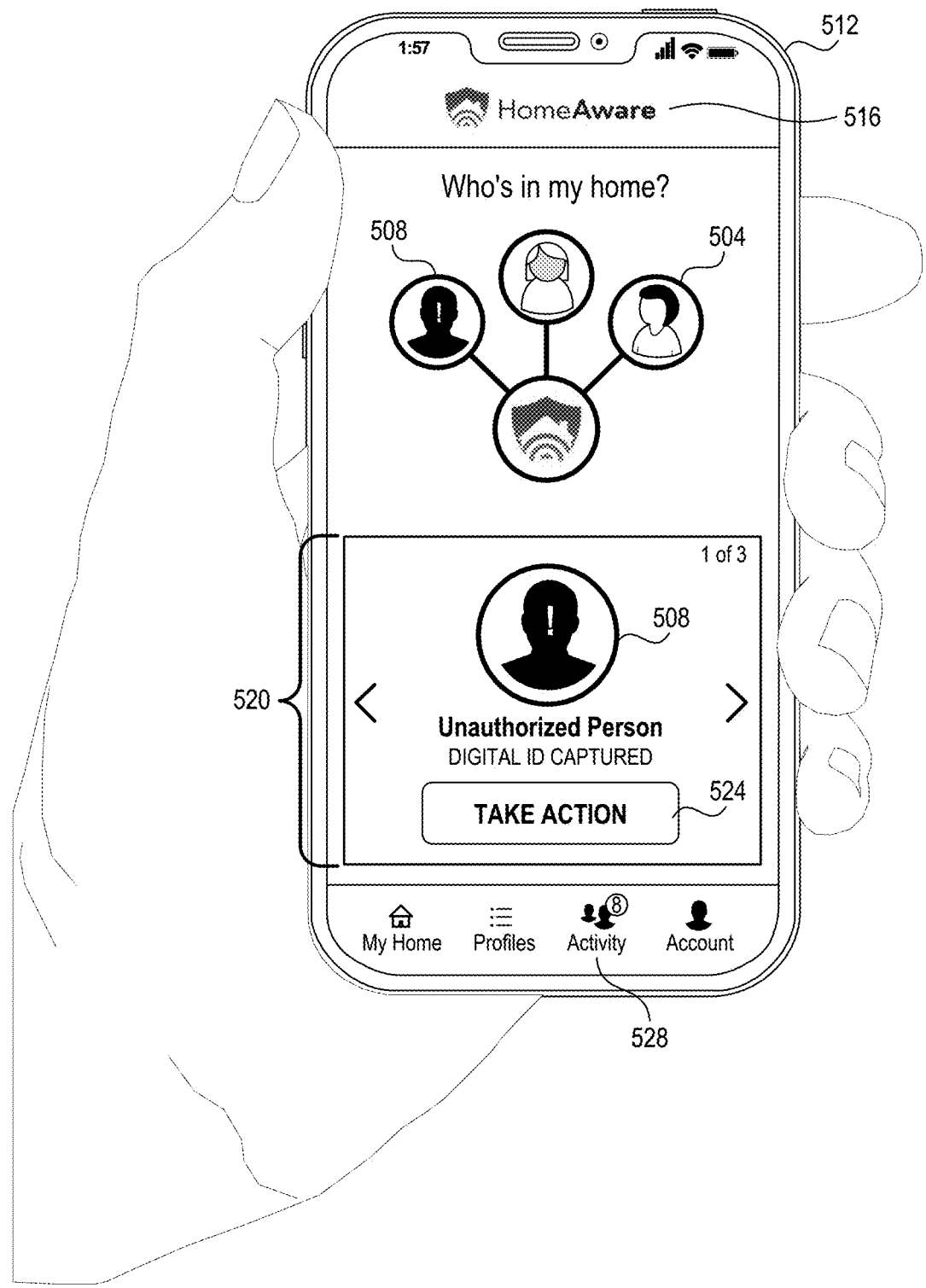
FIG. 5 is a drawing that illustrates a software application operating on a user device.

In act 424, the computer system transmits the number of unique electronic devices determined to be present to a user device. An example user device 140 is illustrated and described in more detail with reference to FIG. 1. An application executing on the user device can generate a graphical representation on a screen of the user device describing the electronic devices present in proximity to the Bluetooth receiver. For example, the application 516 operates on example user device 512 as shown by FIG. 5 to describe the devices 504, 508 detected. The graphical representation describes the electronic devices detected and identified to be present in proximity to the Wi-Fi receiver (e.g., in or near a home or business). The application can identify known devices 504 (see FIG. 5) whose details have been programmed into the application. For example, the known devices are identified from known data values that they broadcast in BLE signals. The disclosed application therefore enhances situational awareness by providing real-time insights into the number and types of devices present in an area. For instance, it can alert homeowners to unexpected or excessive device activity, helping them stay informed about their surroundings. Moreover, the disclosed technology helps detect anomalies in physical presence.

The graphical representation describes the electronic devices detected and identified to be present in proximity to the Wi-Fi receiver (e.g., in or near a home or business). The application can identify known devices 504 (see FIG. 5) whose details have been programmed into the application. For example, the known devices are identified from known data values that they broadcast in Wi-Fi probe requests. The disclosed application therefore enhances situational awareness by providing real-time insights into the number and types of devices present in an area. For instance, the application alerts homeowners to unexpected or excessive device activity, helping them stay informed about their surroundings. Moreover, the disclosed technology helps detect anomalies in physical presence.

An electronic device that is emitting Bluetooth Advertising Packets can lack a Bluetooth connection to another Bluetooth Low Energy (BLE)-capable device in proximity to the electronic device. The electronic device emits BLE signals to search for the other BLE-capable device. The electronic device can also have a Bluetooth connection to the other BLE-capable device; in such scenarios, the electronic device emits BLE signals to search for other Bluetooth-capable devices. The Bluetooth receiver can be connected to a Wi-Fi network at a home or business. The BLE requests received are network discovery tools: BLE-enabled devices will emit BLE signals to obtain information about and connect to nearby BLE-capable devices. Therefore, the disclosed technology can identify unfamiliar devices 508 (see FIG. 5) entering a location, such as a home or a commercial space, without the need for these devices to connect to a BLE-capable device. The disclosed methods thus enable the identification of potential security threats or unauthorized access.

FIG. 5 is a drawing that illustrates a software application 516 operating on a user device 512. User device 512 is the same as or similar to user device 104 shown by FIG. 1. A computer system determines a number of unique electronic devices 504, 508 detected to user device 512 using the methods described in more detail with reference to FIGS. 1-4. The software application 516 executes on the user device 512 to generate a graphical representation, on a screen of the user device 512, describing the electronic devices 504, 508 present in proximity to a Bluetooth receiver in a home or business associated with user device 512.

In some implementations, the software application 516 indicates that more electronic devices than expected are present in a particular home or business. To determine that more electronic devices than expected are present, the system 100 of FIG. 1 can identify changes in a count of the unique electronic devices present. For example, the system 100 determines that more electronic devices than expected are present in a particular home, given the number of residents of the home, the number of electronic devices connected to the home's Wi-Fi network, and/or the proximity to neighboring homes. The system 100 can determine whether specific types of electronic devices identified to be present are more or less concerning. For example, a video game console that is detected can be less concerning (that could indicate a neighbor's child has come over to play video games). It may be more concerning to detect a wireless device that is cross-referenced to a MAC address known to belong to a stolen device, or an electronic device that has never been associated with the home, the user device 512, or the software application 516.

In some implementations, details and identifiers of "known" electronic devices are incorporated into the software application 516 to inform the determination of the "expected number of electronic devices" at a location. For example, if three residents are home and each has an associated smartphone, the expected number of electronic devices would be three. The expected number of electronic devices present can be compared to the number of the electronic devices determined to be present to determine whether anomalous behavior is observed at a location. For example, the software application 516 indicates the expected number of electronic devices at a location, given the number of residents of the home, the number of electronic devices connected to the home's Wi-Fi network, and/or the proximity to neighboring homes. The software application 516 can also indicate the actual number of electronic devices presently observed (from the machine learning model).

In some implementations as shown by FIG. 5, the software application 516 shown by FIG. 5 displays three electronic devices detected to be present based on BLE signals emitted. In some implementations, other types of signals such as cellular signals and/or Wi-Fi probe requests are used. Electronic device 504 is associated with a known user. Information associated with electronic device 504 has previously been added to the software application 516 for the home or business that the user of the software application 516 is associated with. The electronic device 508 detected is an unknown device. A digital ID (e.g., device classification, MAC address, metadata within BLE signals broadcast by electronic device 508) is captured and displayed within section 520 of the graphical representation generated by the software application 516.

The digital ID is sometimes referred to as a digital fingerprint or a device fingerprint. A device fingerprint or machine fingerprint describes information collected about the software and/or hardware of electronic device for the purpose of device identification. The information can be assimilated into a digital ID using a fingerprinting algorithm. Device fingerprints can be used to identify individual devices fully or partially. Identifiers such as a MAC address and/or a serial number assigned to machine hardware of an electronic device can be used for uniquely identifying the device. The digital IDs of electronic devices detected can be stored on cloud server 132 and/or compared to other digital IDs stored on the cloud server 132. In some implementations, the application 516 or another computer system determines whether the device fingerprint of device 508 matches device fingerprints of other electronic devices that are stored on the cloud server 132. The application 516 can transmit a user or a remote computer an alert (e.g., within section 520 of the graphical representation generated by the software application 516) if the device fingerprint of device 508 does not match the device fingerprints of other electronic devices that are stored on the cloud server 132.

The user of electronic device 512 can take action 524 in response to the detection of electronic device 508, e.g., notifying a home security service, notifying the police, instructing a home security system to capture images, and/or instructing the software application 516 to block the electronic from access to a home Wi-Fi router and other home devices.

In some implementations, the application 516 shown by FIG. 5 or instructions running on a computer system generates an analysis of BLE and/or Wi-Fi signals broadcast by the electronic devices 504, 508. For example, the application 516 can perform an analysis of localization-based services built on top of emitted signals, and identify groups of people having similar behaviors in the way they visit a particular area, and/or leverage information contained in emitted signals to automatically detect if the transmitting device is a smartphone or a laptop. This information can further be used to optimize the network configuration and/or implement services such as management of network or smart content caching approaches.

In some implementations, signals emitted by example devices 504, 508 are used to localize users by creating location-based heat maps, parametric model-based triangulation approaches, and/or fingerprinting. A set of features derived from the analysis of signals indicate the timeframe that is used to cluster users in different groups. Groups of users with different behaviors can be highlighted and separated. Moreover, the signals can be used to determine geographical features of users. Further, smartphone/laptop classification can be performed by collecting (and parsing) the signals without invasive deep packet inspection techniques. The classification framework characterizes each electronic device with a set of features extracted from the signals. A reference set of feature captures information on the temporal process of BLE signal transmission (how frequently BLE signals are transmitted) and the power levels used in the BLE signal transmission. A supervised learning approach is used to train different classifiers able to predict the type of transmitting device by extracting its corresponding features.

Figure 6:
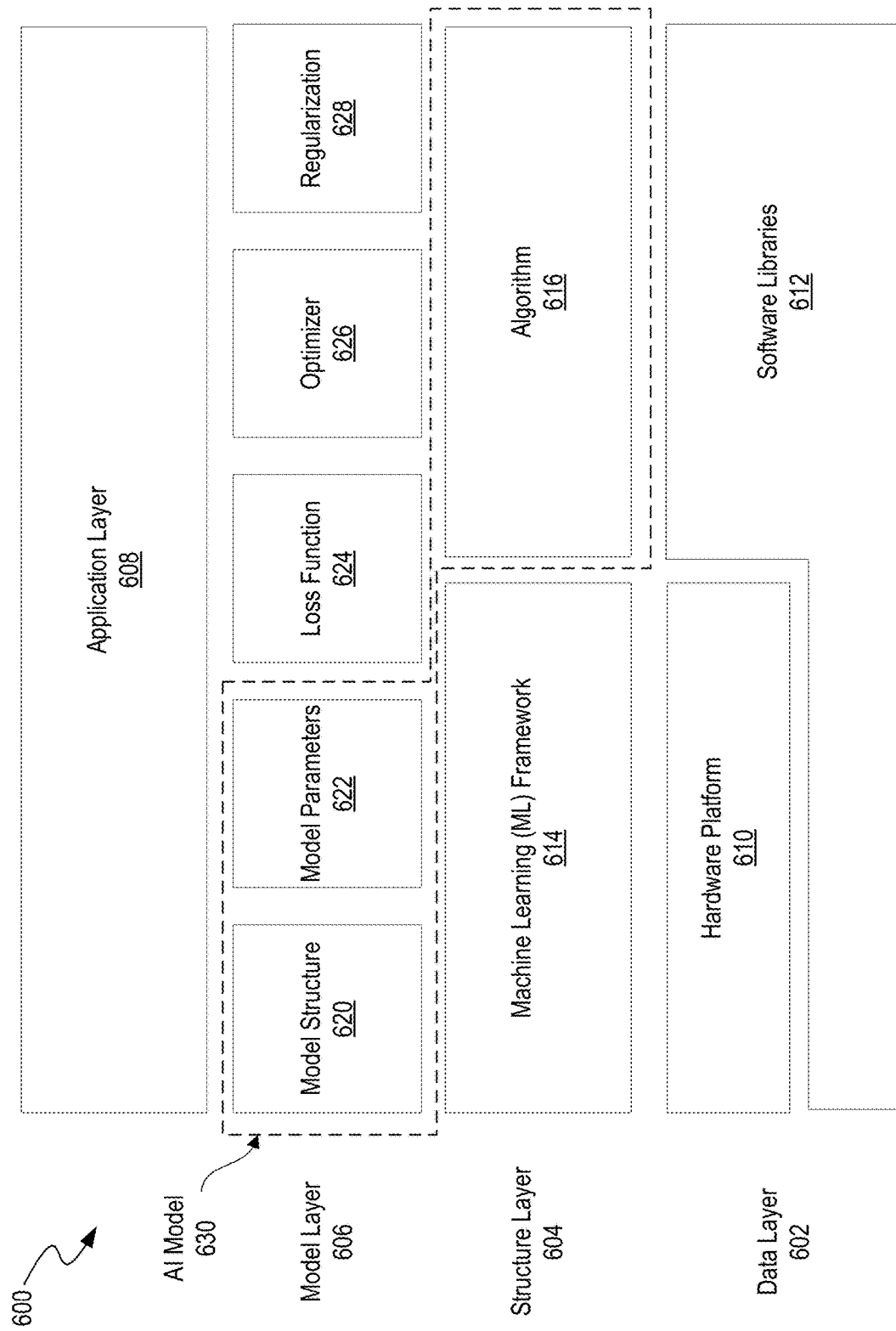
FIG. 6 is a block diagram that illustrates an example artificial intelligence (AI) system that can implement aspects of the present technology.

FIG. 6 is a block diagram that illustrates an example artificial intelligence (AI) system 600 that can implement aspects of the present technology. The AI system 600 is implemented using components of the example computer system 700 illustrated and described in more detail with reference to FIG. 7. For example, the AI system 600 can be implemented using the processor 702 and instructions 708 programmed in the memory 706 illustrated and described in more detail with reference to FIG. 7. Likewise, implementations of the AI system 600 can include different and/or additional components or be connected in different ways.

As shown, the AI system 600 can include a set of layers, which conceptually organize elements within an example network topology for the AI system's architecture to implement a particular AI model 630. The AI model 630 is the same as or similar to the machine learning model described with reference to FIGS. 1-7. Generally, an AI model 630 is a computer-executable program implemented by the AI system 600 that analyzes data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form the example AI model 630. The optimizer 626, loss function engine 624, and regularization engine 628 work to refine and optimize the AI model 630, and the data layer 602 provides resources and support for application of the AI model 630 by the application layer 608.

The data layer 602 acts as the foundation of the AI system 600 by preparing data for the AI model 630. As shown, the data layer 602 can include two sub-layers: a hardware platform 610 and one or more software libraries 612. The hardware platform 610 can be designed to perform operations for the AI model 630 and include computing resources for storage, memory, logic, and networking, such as the resources described in relation to FIG. 7. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 610 can include Infrastructure as a Service (IaaS) resources, which are computing resources, (e.g., servers, memory, etc.) offered by a cloud services provider. The hardware platform 610 can also include computer memory for storing data about the AI model 630, application of the AI model 630, and training data for the AI model 630. The computer memory can be a form of random-access memory (RAM), such as dynamic RAM, static RAM, and non-volatile RAM.

The software libraries 612 can be thought of as suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, allowing them to run quickly with a small memory footprint. Examples of software libraries 612 that can be included in the AI system 600 include Intel Math Kernel Library, Nvidia cuDNN, Eigen, and Open BLAS.

The structure layer 604 can include a machine learning (ML) framework 614 and an algorithm 616. The machine learning framework 614 can be thought of as an interface, library, or tool that allows users to build and deploy the AI model 630. The machine learning framework 614 can include an open-source library, an application programming interface (API), a gradient-boosting library, an ensemble method, and/or a deep learning toolkit that work with the layers of the AI system facilitate development of the AI model 630. For example, the machine learning framework 614 can distribute processes for application or training of the AI model 630 across multiple resources in the hardware platform 610. The machine learning framework 614 can also include a set of pre-built components that have the functionality to implement and train the AI model 630 and allow users to use pre-built functions and classes to construct and train the AI model 630. Thus, the machine learning framework 614 can be used to facilitate data engineering, development, hyperparameter tuning, testing, and training for the AI model 630.

Examples of machine learning frameworks 614 or libraries that can be used in the AI system 600 include TensorFlow, PyTorch, Scikit-Learn, Keras, and Caffe. Random Forest is a machine learning algorithm that can be used within the machine learning frameworks 614. LightGBM is a gradient boosting framework/algorithm (a machine learning technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying machine learning models.

In some embodiments, the machine learning framework 614 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 600. For example, the machine learning framework 614 can use a cascade of multiple layers of nonlinear processing units for implicit feature extraction and transformation. Each successive layer uses the output from the previous layer as input. The AI model 630 can thus learn in supervised (e.g., classification) and/or unsupervised (e.g., pattern analysis) modes. The AI model 630 can learn multiple levels of representations that correspond to different levels of abstraction, wherein the different levels form a hierarchy of concepts. In this manner, AI model 630 can be configured to differentiate features of interest from background features.

The algorithm 616 can be an organized set of computer-executable operations used to generate output data from a set of input data and can be described using pseudocode. The algorithm 616 can include complex code that allows the computing resources to learn from new input data and create new/modified outputs based on what was learned. In some implementations, the algorithm 616 can build the AI model 630 through being trained while running computing resources of the hardware platform 610. This training allows the algorithm 616 to make decisions without being explicitly programmed to do so. Once trained, the algorithm 616 can run at the computing resources as part of the AI model 630 to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include data received from user equipment. The user may label the training data based on one or more classes and trains the AI model 630 by inputting the training data to the algorithm 616. The algorithm determines how to label the new data based on the labeled training data. The user can facilitate collection, labeling, and/or input via the machine learning framework 614. In some instances, the user may convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are less than an accuracy threshold.

Supervised learning can involve classification and/or regression. Classification techniques involve teaching the algorithm 616 to identify a category of new observations based on training data and are used when input data for the algorithm 616 is discrete. Said differently, when learning through classification techniques, the algorithm 616 receives training data labeled with categories (e.g., device types, makes, or models) and determines how features observed in the training data (e.g., MAC addresses) relate to the categories. Once trained, the algorithm 616 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Another way unsupervised learning is used to train the algorithm 616 to find an underlying structure of a set of data is to group the data according to similarities and represent that set of data in a compressed format. The systems disclosed herein can use unsupervised learning to identify patterns in data received by a Bluetooth receiver and so forth.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 616 may be trained to be a k-means clustering algorithm, which partitions n observations in k clusters such that each observation belongs to the cluster with the nearest mean serving as a prototype of the cluster. Anomaly detection techniques are used to detect unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 616 include factor analysis, item response theory, latent profile analysis, and latent class analysis.

In some embodiments, the AI system 600 trains the algorithm 616 of AI model 630, based on the training data, to correlate the feature vector to expected outputs in the training data. As part of the training of the AI model 630, the AI system 600 forms a training set of features and training labels by identifying a positive training set of features that have been determined to have a desired property in question, and, in some embodiments, forms a negative training set of features that lack the property in question. The AI system 600 applies machine learning framework 614 to train the AI model 630, that when applied to the feature vector, outputs indications of whether the feature vector has an associated desired property or properties, such as a probability that the feature vector has a particular Boolean property, or an estimated value of a scalar property. The AI system 600 can further apply dimensionality reduction (e.g., via linear discriminant analysis (LDA), PCA, or the like) to reduce the amount of data in the feature vector to a smaller, more representative set of data.

The model layer 606 implements the AI model 630 using data from the data layer and the algorithm 616 and machine learning framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model 630 of the AI system 600. The model structure 620 defines the complexity of the pattern/relationship that the AI model 630 expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 620 may include one or more hidden layers of nodes between the input and output layers. The model structure 620 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weight and bias the nodes and connections of the model structure 620. For instance, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model 630's performance during training. For instance, the loss function engine 624 can measure the difference between a predicted output of the AI model 630 and the actual output of the AI model 630 and is used to guide optimization of the AI model 630 during training to minimize the loss function. The loss function may be presented via the machine learning framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model 630. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used may be determined based on the type of model structure 620 and the size of data and the computing resources available in the data layer 602.

The regularization engine 628 executes regularization operations. Regularization is a technique that prevents over- and under-fitting of the AI model 630. Overfitting occurs when the algorithm 616 is overly complex and too adapted to the training data, which can result in poor performance of the AI model 630. Underfitting occurs when the algorithm 616 is unable to recognize even basic patterns from the training data such that it cannot perform well on training data or on validation data. The regularization engine 628 can apply one or more regularization techniques to fit the algorithm 616 to the training data properly, which helps constraint the resulting AI model 630 and improves its ability for generalized application. Examples of regularization techniques include lasso (L1) regularization, ridge (L2) regularization, and elastic (L1 and L2 regularization).

In some embodiments, the AI system 600 can include a feature extraction module implemented using components of the example computer system 700 illustrated and described in more detail with reference to FIG. 7. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 630 by using this reduced representation. In some example embodiments, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

The application layer 608 describes how the AI system 600 is used to solve problems or perform tasks. In an example implementation, the application layer 608 can include instructions executed by the system 100 illustrated and described in more detail with reference to FIG. 1. Referring still to the example implementation, the system 100 can include an AI platform with a plurality of environment-type-specific AI modules. The environment-type-specific AI modules can include the AI system 600 and can be applied to data obtained from the environment to provide environmental mapping. The environment-type-specific AI modules can be trained using environment-type grouped data sets, including environment-type mappings. Environment-type mappings can include layers based on the environment type.

In some implementations, prompt engineering is used to structure text that can be interpreted by a generative AI model. An example prompt can include the following elements: instruction, context, input data, and an output specification. Although a prompt (sometimes referred to as a command set or instruction set) is a natural-language entity (e.g., "Please generate an image of the detected unknown device"), a number of prompt engineering strategies can help structure the prompt in a way that improves the quality of output. These techniques include being precise, specifying context, specifying output parameters, specifying target knowledge domain, and so forth. For example, automatic prompt engineering techniques, can, for example, include using a trained large language model (LLM) to generate a plurality of candidate prompts, automatically score the candidates, and select the top candidates.

Prompt engineering can enable various technical improvements. Technical improvements can include automation of a target process—for instance, a prompt can cause an AI model to generate computer code, to call functions in an API, and so forth. Additionally, technical improvements can include automation of the prompt engineering process itself—for example, an automatically generated sequence of cascading prompts can include sequences of prompts that use tokens from AI model outputs as further instructions, context, inputs, or output specifications for downstream AI models. Technical improvements associated with prompt engineering can further include improved training techniques for LLMs that generate prompts (e.g., chain-of-thought prompting) and improved cost control (e.g., dynamically setting stop sequences to manage the number of automatically generated candidate prompts, dynamically tuning parameters of prompt generation models or downstream models).

Figure 7:
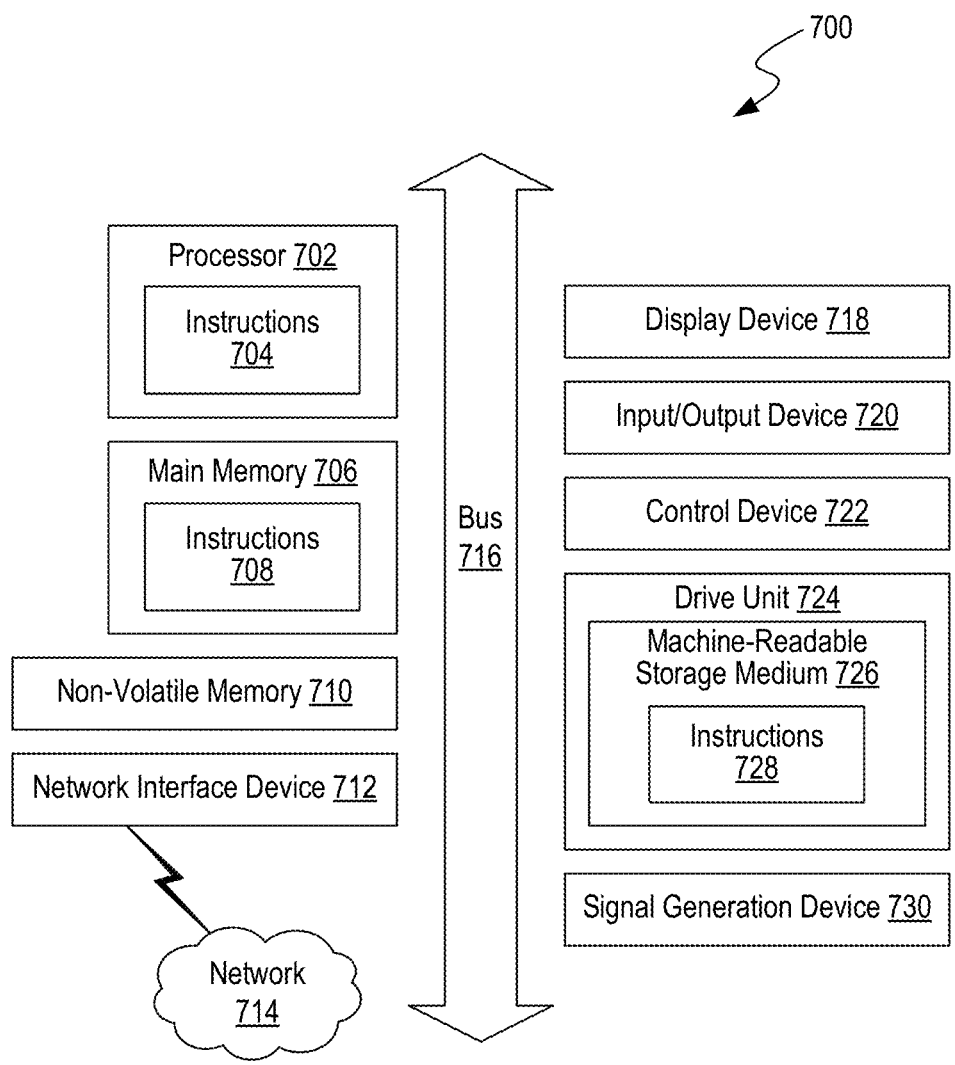
FIG. 7 is a block diagram that illustrates an example computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system for detecting presence of one or more electronic devices in proximity to a Bluetooth receiver, the computer system comprising:
    at least one hardware processor; and
    at least one non-transitory computer-readable storage medium storing instructions, which, when executed by the at least one hardware processor, cause the computer system to:
        receive, via the Bluetooth receiver, multiple Bluetooth Advertising Packets emitted by the one or more electronic devices,
            wherein the Bluetooth Advertising Packets include multiple media access control (MAC) addresses including primary MAC addresses of the electronic devices and secondary MAC addresses of the electronic devices;
        store the multiple MAC addresses in a memory of the computer system:
        determine, using a machine learning model, that at least one MAC address was broadcast by an electronic device having a device type that is unsupported by the computer system for counting the electronic devices;
        remove the at least one MAC address from the multiple MAC addresses;
        determine which of the multiple MAC addresses are the primary MAC addresses based on hexadecimal character sequences extracted from metadata fields of the Bluetooth Advertising Packets;
        determine, based on the hexadecimal character sequences, that a first set of the primary MAC addresses broadcast by the electronic devices changed to a second set of the primary MAC addresses;
        determine a number of the electronic devices present in proximity to the Bluetooth receiver by counting the electronic devices based on the second set of the primary MAC addresses; and transmit the number of the electronic devices to a user device for an application executing on the user device to generate a graphical representation, on a screen of the user device, describing the electronic devices present in proximity to the Bluetooth receiver.

2. The computer system of claim 1, wherein the computer system includes the Bluetooth receiver.

3. The computer system of claim 1, wherein at least one of the electronic devices lacks a Bluetooth connection to a Bluetooth Low Energy (BLE)-capable device in proximity to the at least one of the electronic devices, and wherein the at least one of the electronic devices emits BLE signals to search for the BLE-capable device.

4. The computer system of claim 1, wherein at least one of the electronic devices has a Bluetooth connection to a Bluetooth Low Energy (BLE)-capable device in proximity to the at least one of the electronic devices.

5. The computer system of claim 1, wherein the computer system is a cloud server.

6. The computer system of claim 1, wherein the instructions cause the computer system to transmit the number of the electronic devices to the user device via a cellular connection or a Wi-Fi connection.

7. A computer-implemented method for detecting presence of one or more electronic devices, the method comprising:

receiving, via a Bluetooth receiver, multiple Bluetooth Low Energy (BLE) signals broadcast by the electronic devices;

storing the BLE signals in a memory of a computer system;

filtering, using a machine learning model, the BLE signals to provide a set of the BLE signals broadcast by a set of the electronic devices having device types that are supported by the computer system for counting the electronic devices, wherein the set of the BLE signals includes multiple primary media access control (MAC) addresses and at least one secondary MAC address broadcast by the set of the electronic devices;

removing the at least one secondary MAC address from the set of the BLE signals, based on hexadecimal character sequences extracted from metadata fields of the set of the BLE signals, for determining a number of the set of the electronic devices;

determining, based on timestamps of the primary MAC addresses, that a first set of the primary MAC addresses broadcast by the electronic devices changed to a second set of the primary MAC addresses;

determining the number of the set of the electronic devices by counting the electronic devices based on the second set of the primary MAC addresses; and transmitting the number of the set of the electronic devices to a user device.

8. The computer-implemented method of claim 7, wherein filtering the BLE signals comprises:

extracting a feature vector from the BLE signals, wherein the feature vector is indicative of the device types; and providing, based on the feature vector, the set of the BLE signals.

9. The computer-implemented method of claim 7, comprising:

training the machine learning model, using Bluetooth Advertising Packets, to determine that the Bluetooth Advertising Packets are associated with unsupported device types.

10. The computer-implemented method of claim 7, comprising:

determining makes and/or models of the electronic devices based on the hexadecimal character sequences; and transmitting information describing the makes and/or models to the user device.

11. The computer-implemented method of claim 7, comprising determining the second set of the primary MAC addresses based on manufacturer data extracted from the metadata fields of the set of the BLE signals.

12. The computer-implemented method of claim 7, wherein determining that the first set of the primary MAC addresses changed to the second set of the primary MAC addresses comprises:

determining a cadence of change of the primary MAC addresses based on the timestamps.

13. The computer-implemented method of claim 7, wherein determining that the first set of the primary MAC addresses changed to the second set of the primary MAC addresses is based on the hexadecimal character sequences.

14. At least one non-transitory computer-readable storage medium storing instructions, which, when executed by at least one hardware processor of a computer system, cause the computer system to:

receive, via a Bluetooth receiver, multiple BLE signals including multiple primary media access control (MAC) addresses and at least one secondary MAC address broadcast by one or more electronic devices;

store the BLE signals in a memory of the computer system;

determine, using a machine learning model, that at least one MAC address was broadcast by an electronic device having a device type that is unsupported by the computer system for counting the electronic devices;

remove the at least one MAC address from the BLE signals;

identify the primary MAC addresses based on hexadecimal character sequences extracted from metadata fields of the BLE signals;

determine, based on the hexadecimal character sequences, that a first set of the primary MAC addresses broadcast by the electronic devices changed to a second set of the primary MAC addresses;

determine a number of the electronic devices by counting the electronic devices based on the second set of the primary MAC addresses; and transmit the number of the electronic devices to a user device.

15. The at least one non-transitory computer-readable storage medium of claim 14, wherein the instructions cause the computer system to:

determine that the first set of the primary MAC addresses changed to the second set of the primary MAC addresses based on timestamps of the primary MAC addresses.

16. The at least one non-transitory computer-readable storage medium of claim 14, wherein the instructions cause the computer system to:

extract a first data value and a second data value from the BLE signals; and determine that a particular one of the electronic devices broadcast a particular one of the first set of the primary MAC addresses and a particular one of the second set of the primary MAC addresses based on comparing the first data value with the second data value.

17. The at least one non-transitory computer-readable storage medium of claim 14, wherein the instructions cause the computer system to:
   transmit information describing the BLE signals to the user device to cause the user device to generate a graphical representation describing the electronic devices.

18. The at least one non-transitory computer-readable storage medium of claim 14, wherein the instructions cause the computer system to:
   filter the BLE signals, to remove MAC addresses associated with device types unsupported for determining the number of the electronic devices.

19. The at least one non-transitory computer-readable storage medium of claim 14, wherein the computer system is a cloud server.

* * * * *